US011577756B2

(12) United States Patent
Hayes et al.

(10) Patent No.: US 11,577,756 B2
(45) Date of Patent: Feb. 14, 2023

(54) DETECTING OUT-OF-MODEL SCENARIOS FOR AN AUTONOMOUS VEHICLE

(71) Applicant: GHOST AUTONOMY INC., Mountain View, CA (US)

(72) Inventors: John Hayes, Mountain View, CA (US); Volkmar Uhlig, Cupertino, CA (US); Akash J. Sagar, Redwood City, CA (US); Nima Soltani, Los Altos, CA (US); Feng Tian, Foster City, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 400 days.

(21) Appl. No.: 16/672,334

(22) Filed: Nov. 1, 2019

(65) Prior Publication Data

US 2021/0078611 A1 Mar. 18, 2021

Related U.S. Application Data

(60) Provisional application No. 62/900,032, filed on Sep. 13, 2019.

(51) Int. Cl.
*B60W 60/00* (2020.01)
*B60W 50/00* (2006.01)
*G05D 1/02* (2020.01)
*B60R 11/04* (2006.01)
*G06N 20/00* (2019.01)
*G06V 20/56* (2022.01)

(52) U.S. Cl.
CPC ....... *B60W 60/00272* (2020.02); *B60R 11/04* (2013.01); *B60W 50/0097* (2013.01); *G05D 1/0221* (2013.01); *G06N 20/00* (2019.01); *G06V 20/56* (2022.01); *B60R 2300/804* (2013.01); *B60R 2300/8086* (2013.01)

(58) Field of Classification Search
CPC .......... G06K 9/6281; B60R 2300/8086; B60R 2300/804; B60R 11/04; G06V 20/56; G06N 20/00; G06N 3/0454; G05D 1/0221; G05D 1/0088; B60W 60/00272; B60W 50/0097
See application file for complete search history.

(56) References Cited

U.S. PATENT DOCUMENTS

| | | | |
|---|---|---|---|
| 10,059,334 B1* | 8/2018 | Zhu | G08G 1/09623 |
| 2008/0084283 A1* | 4/2008 | Kalik | B60Q 9/00 |
| | | | 701/301 |
| 2015/0316383 A1* | 11/2015 | Donikian | G06K 9/6281 |
| | | | 701/408 |
| 2019/0384304 A1* | 12/2019 | Towal | G06V 10/82 |

FOREIGN PATENT DOCUMENTS

WO WO-2020205597 A1 * 10/2020 ........... G05D 1/0088

* cited by examiner

*Primary Examiner* — Kenneth J Malkowski

(57) ABSTRACT

Detecting out-of-model scenarios for an autonomous vehicle including: determining, based on first sensor data from one or more sensors, an environmental state relative to the autonomous vehicle, wherein operational commands for the autonomous vehicle are based on a selected machine learning model, wherein the selected machine learning model comprises a first machine learning model; comparing the environmental state to a predicted environmental state relative to the autonomous vehicle; and determining, based on a differential between the environmental state and the predicted environmental state, whether to select a second machine learning model as the selected machine learning model.

20 Claims, 10 Drawing Sheets

DETECTING OUT-OF-MODEL SCENARIOS FOR AN AUTONOMOUS VEHICLE

CROSS-REFERENCE TO RELATED APPLICATION

This application is a non-provisional application for patent entitled to a filing date and claiming the benefit of earlier-filed U.S. Provisional Patent Application Ser. No. 62/900,032, filed Sep. 13, 2019.

BACKGROUND

Field of the Invention

The field of the invention is vehicle automation, or, more specifically, methods, apparatus, autonomous vehicles, and products for detecting out-of-model scenarios for an autonomous vehicle.

Description of Related Art

Automated vehicles may use machine learning models to determine control operations for the automated vehicle. However, environmental conditions relative to the automated vehicle may change unexpectedly.

SUMMARY

Detecting out-of-model scenarios for an autonomous vehicle may include determining, based on first sensor data from one or more sensors, an environmental state relative to the autonomous vehicle, wherein operational commands for the autonomous vehicle are based on a selected machine learning model, wherein the selected machine learning model comprises a first machine learning model; comparing the environmental state to a predicted environmental state relative to the autonomous vehicle; and determining, based on a differential between the environmental state and the predicted environmental state, whether to select a second machine learning model as the selected machine learning model The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
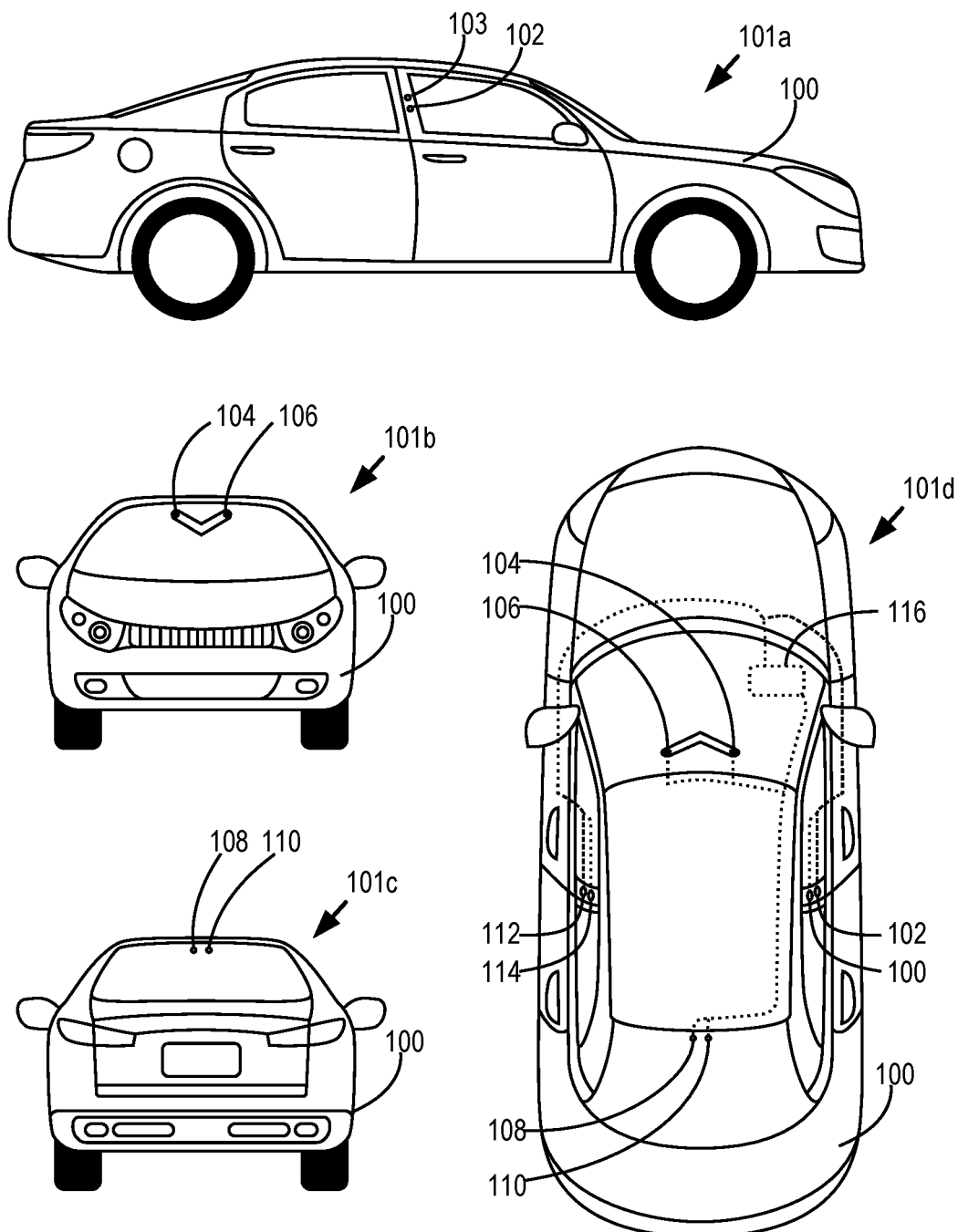
FIG. 1 shows example views of an autonomous vehicle for detecting out-of-model scenarios for an autonomous vehicle.

Detecting out-of-model scenarios for an autonomous vehicle may be implemented in an autonomous vehicle. Accordingly, FIG. 1 shows multiple views of an autonomous vehicle 100 configured for detecting out-of-model scenarios for an autonomous vehicle according to embodiments of the present invention. Right side view 101*a* shows a right side of the autonomous vehicle 100. Shown in the right side view 101*a* are cameras 102 and 103, configured to capture image data, video data, and/or audio data of the environmental state of the autonomous vehicle 100 from the perspective of the right side of the car. Front view 101*b* shows a front side of the autonomous vehicle 100. Shown in the front view 101*b* are cameras 104 and 106, configured to capture image data, video data, and/or audio data of the environmental state of the autonomous vehicle 100 from the perspective of the front of the car. Rear view 101*c* shows a rear side of the autonomous vehicle 100. Shown in the rear view 101*c* are cameras 108 and 110, configured to capture image data, video data, and/or audio data of the environmental state of the autonomous vehicle 100 from the perspective of the rear of the car. Top view 101*d* shows a rear side of the autonomous vehicle 100. Shown in the top view 101*d* are cameras 102-110. Also shown are cameras 112 and 114, configured to capture image data, video data, and/or audio data of the environmental state of the autonomous vehicle 100 from the perspective of the left side of the car.

Further shown in the top view 101*d* is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine a operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for detecting out-of-model scenarios for an autonomous vehicle may also include other vehicles, including motorcycles, planes, helicopters, unmanned aerial vehicles (UAVs, e.g., drones), or other vehicles as can be appreciated. Moreover, it is understood that additional cameras or other external sensors may also be included in the autonomous vehicle 100.

Detecting out-of-model scenarios for an autonomous vehicle in accordance with the present invention is generally implemented with computers, that is, with automated computing machinery. For further explanation, therefore, FIG. 2 sets forth a block diagram of automated computing machinery comprising an exemplary automation computing system 116 configured for detecting out-of-model scenarios for an autonomous vehicle according to embodiments of the present invention. The automation computing system 116 of FIG. 2 includes at least one computer Central Processing Unit (CPU) package 204 as well as random access memory 206 ('RAM') which is connected through a high speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors as can be appreciated. As described herein, cameras may include a stolid state sensor 212 with a solid state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 212 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 214.

Stored in RAM 206 is an automation module 220. The automation module 220 may be configured to process sensor data from the sensors 212 to determine one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222. The autonomous vehicle control systems 223 are configured to affect the movement and operation of the autonomous vehicle 100. For example, the autonomous vehicle control systems 223 may turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor data 212

(e.g., sensor data 212 having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a server 227. Such operations can include filtering, compression, encoding, decoding, or other operations as can be appreciated. The data processing module 226 may then communicate the processed and stored sensor data to the server 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's iOS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
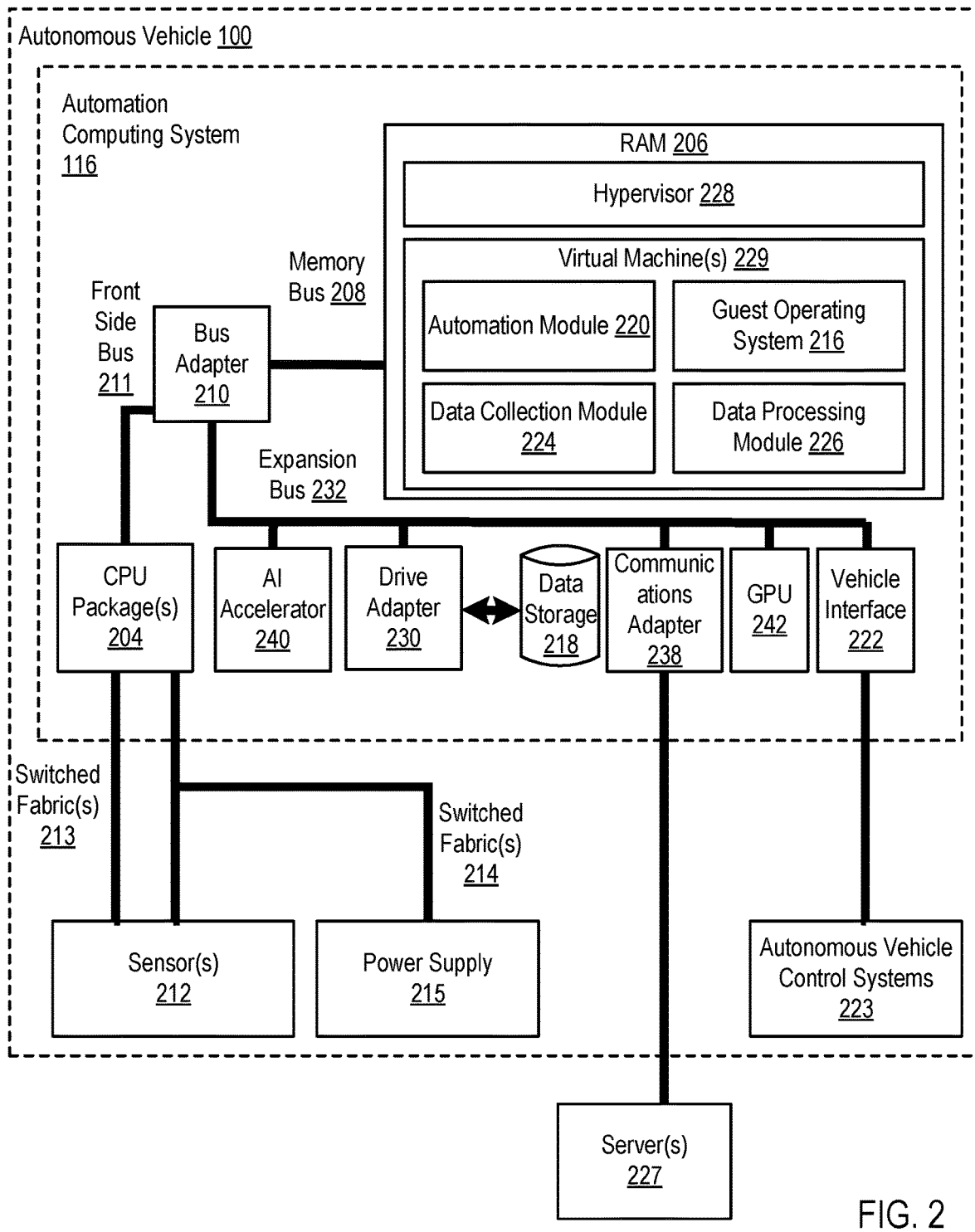
FIG. 2 is block diagram of an autonomous computing system for detecting out-of-model scenarios for an autonomous vehicle.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to processor(s) 204 and other components of the automation computing system 116. Disk drive adapter 230 connects non-volatile data storage to the automation computing system 116 in the form of data storage 213. Disk drive adapters 230 useful in computers configured for detecting out-of-model scenarios for an autonomous vehicle according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for detecting out-of-model scenarios for an autonomous vehicle according to embodiments of the present invention include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed servers 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
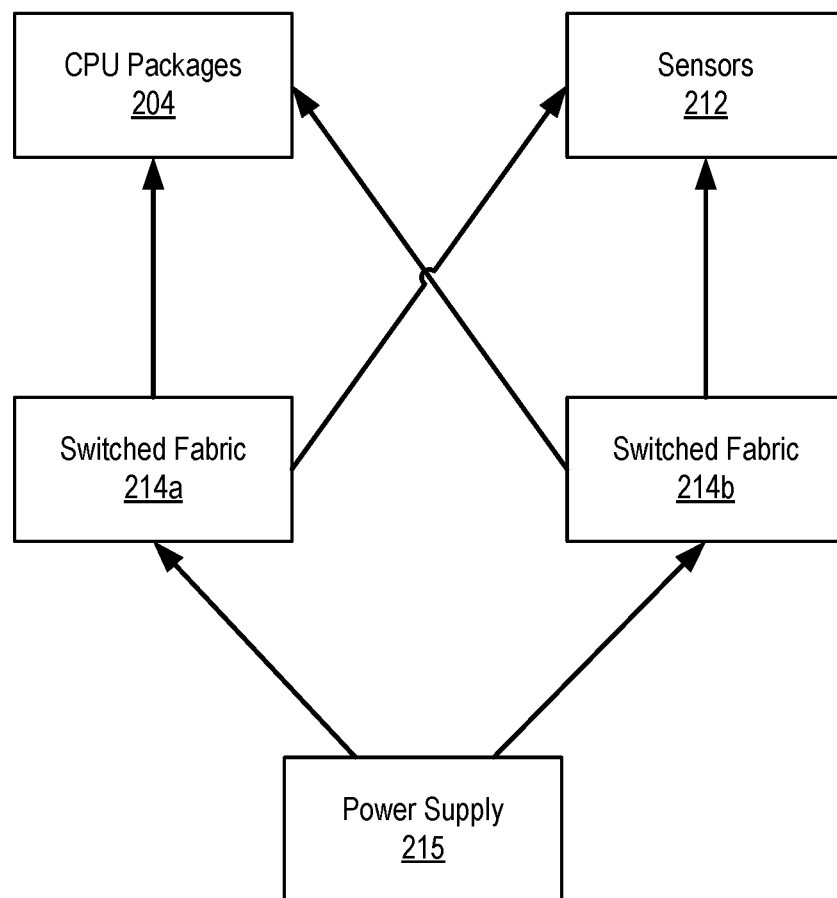
FIG. 3 is a block diagram of a redundant power fabric for detecting out-of-model scenarios for an autonomous vehicle.

FIG. 3 shows an example redundant power fabric that may be useful in detecting in versus out-of-model scenarios. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
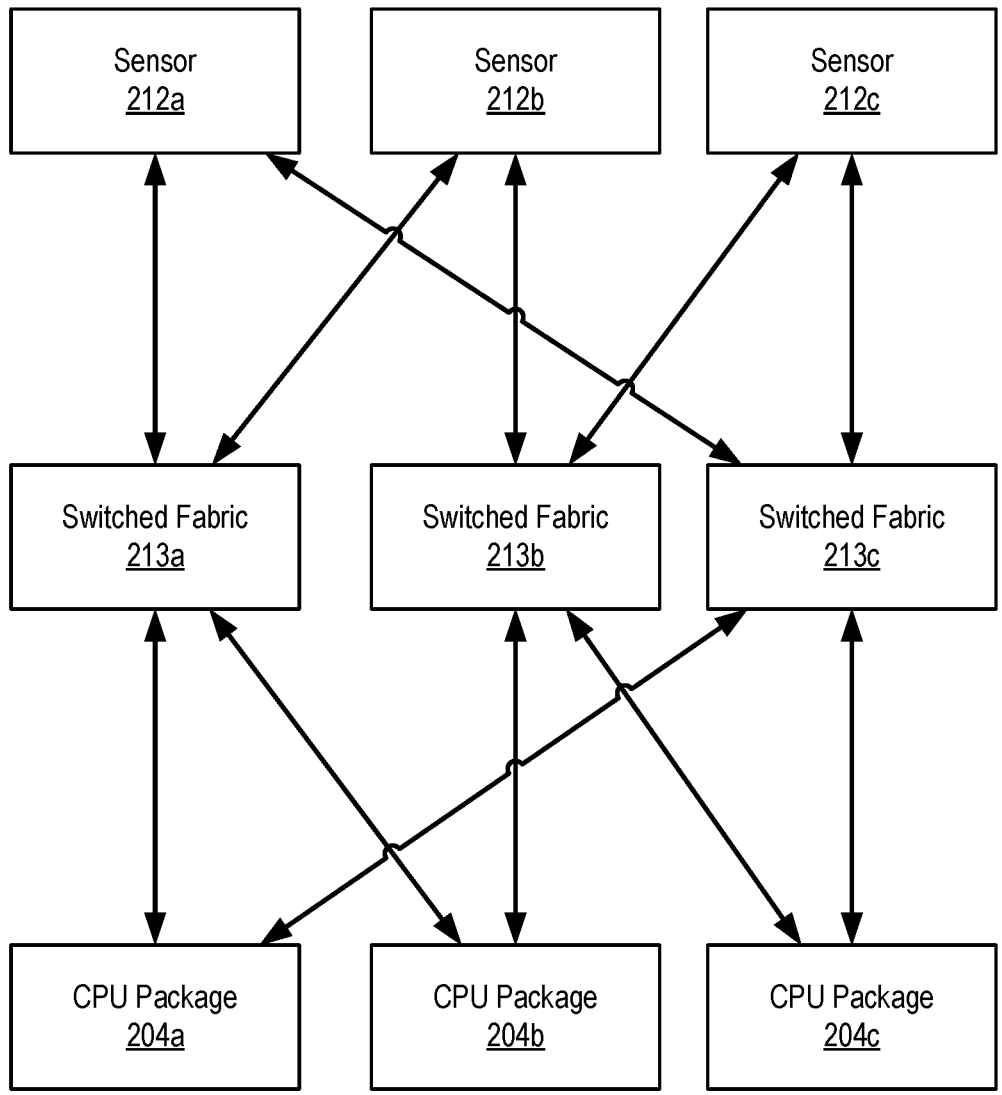
FIG. 4 is a block diagram of a redundant data fabric for detecting out-of-model scenarios for an autonomous vehicle.

FIG. 4 is an example redundant data fabric for detecting out-of-model scenarios for an autonomous vehicle. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
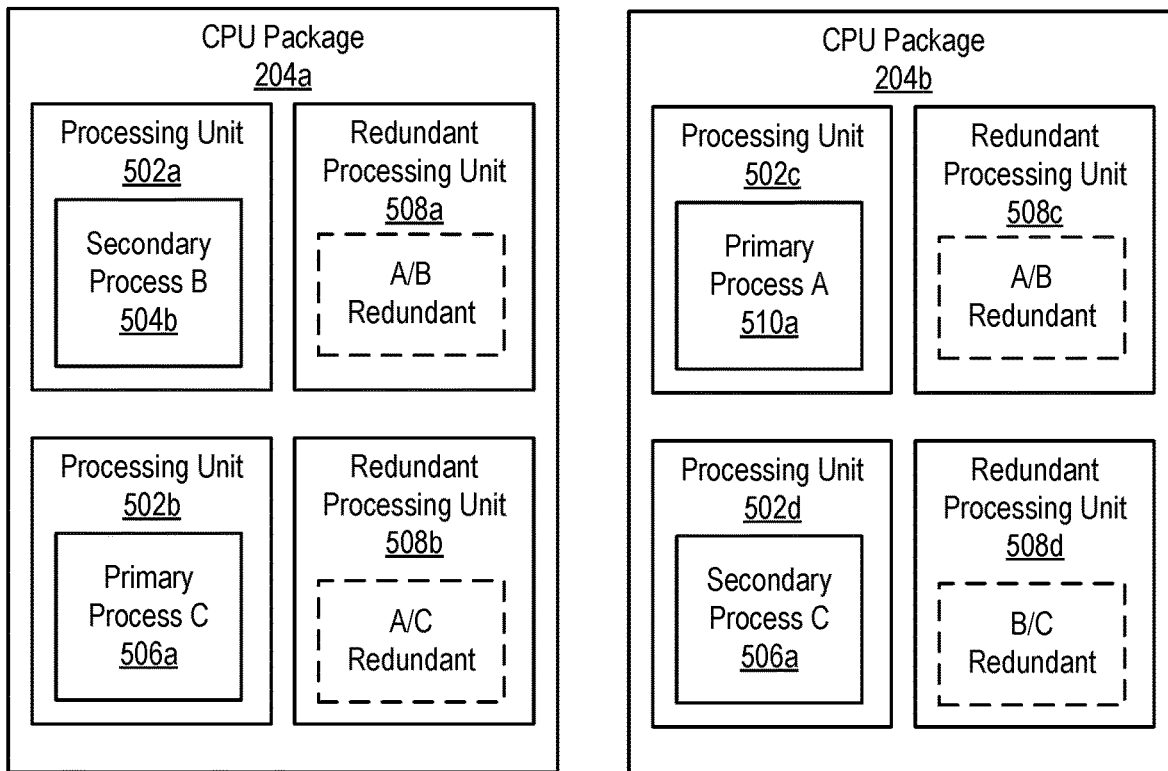
FIG. 5 is an example view of process allocation across CPU packages for detecting out-of-model scenarios for an autonomous vehicle.
Figure 5:
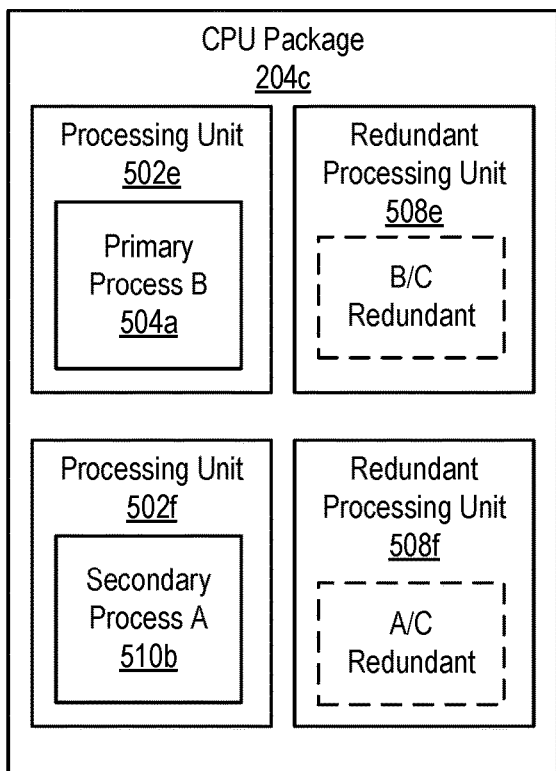

FIG. 5 is an example view of process allocation across CPU packages for detecting out-of-model scenarios for an autonomous vehicle. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "A/B redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A,"

denoted as primary process A 510a, and processing unit 502d, which has been allocated secondary execution of "process C," denoted as secondary process C 506a. CPU package 204b also includes redundant processing unit 508c, reserved as "A/B redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510a. CPU package 204c also includes redundant processing unit 508e, reserved as "B/C redundant," and redundant processing unit 508f, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
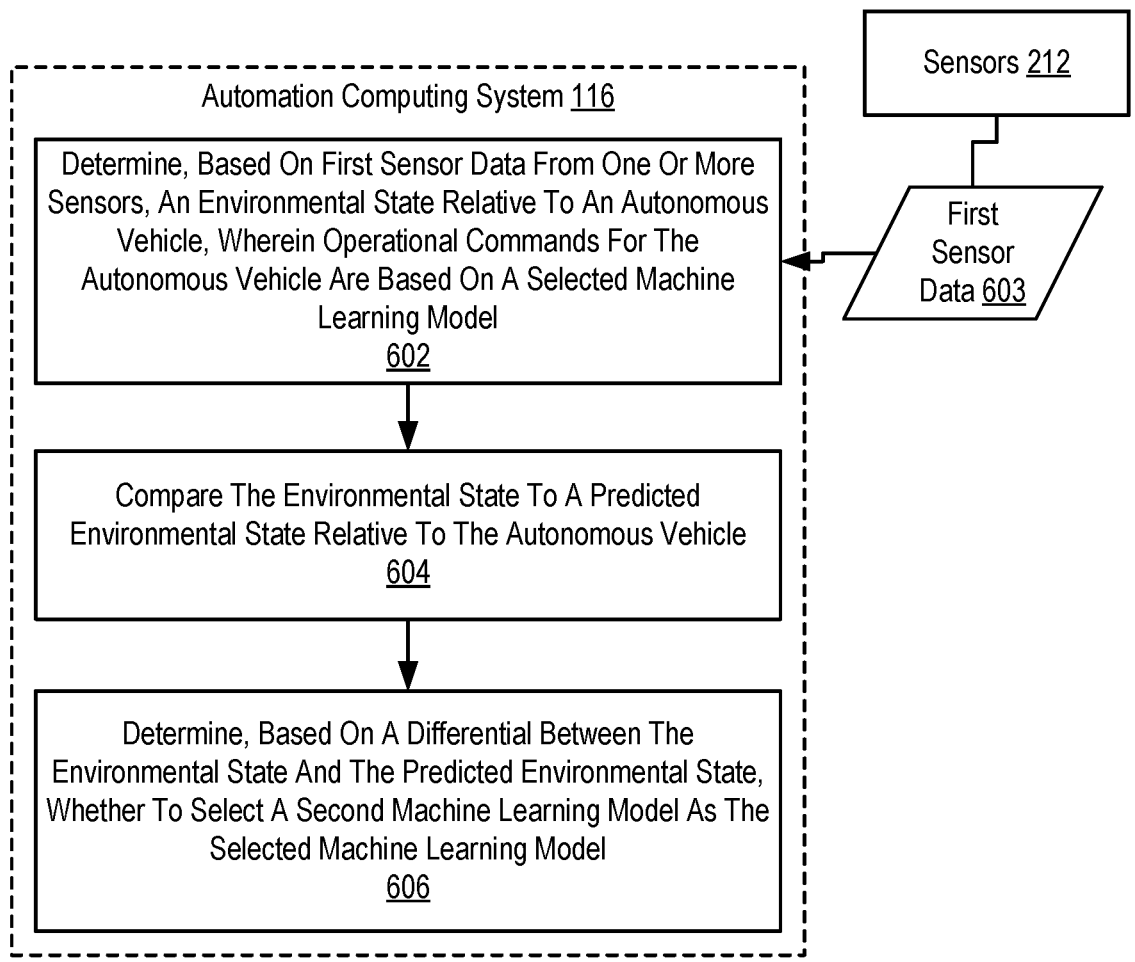
FIG. 6 is a flowchart of an example method for detecting out-of-model scenarios for an autonomous vehicle.

For further explanation, FIG. 6 sets forth a flow chart illustrating an exemplary method for detecting out-of-model scenarios for an autonomous vehicle that includes determining 602 (e.g., by an automation computing system 116, by an automation module 220 of the automation computing system 116), based on first sensor data 603 from one or more sensors 212, an environmental state relative to the autonomous vehicle 100, wherein operational commands for the autonomous vehicle 100 are based on a selected machine learning model, wherein the selected machine learning model comprises a first machine learning model. The first machine learning model may be one of a plurality of machine learning models usable to generate operational commands for the autonomous vehicle 100. Each of the machine learning models may correspond to a particular driving mode of the autonomous vehicle 100. Examples of driving modes may include cruising (e.g., maintaining a particular speed), braking, lane changing, entering or exiting a highway, etc. Accordingly, the automated vehicle 100 (e.g., the automation module 220) may use a corresponding machine learning model to determine operational commands dependent on the current driving mode of the automated vehicle 100. Accordingly, the first machine learning model corresponds to a driving mode of the operational vehicle 100 when the environmental state is determined.

The environmental state relative to the automated vehicle 100 comprises a state of the environment around the automated vehicle 100 as detected by one or more sensors 212. The environmental state may comprise a plurality of aggregated states from different perspectives (e.g., sensing spaces) of the automated vehicle 100. For example, the environmental state relative to the automated vehicle 100 may comprise video data from the front side of the automated vehicle, left and right sides of the automated vehicle, and the rear side of the automated vehicle, etc. Accordingly, the environmental state relative to the automated vehicle 100 may correspond to a current time.

Determining 602 the environmental state may comprise identifying, in video data of the first sensor data 603, one or more visual anchors. The visual anchors may comprise image objects in the video data. Image objects comprise two-dimensional projections of physical objects as captured by camera sensors 212. Such visual anchors may include lane markers, street signs, traffic signals, pedestrians or other persons, vehicles on the road, parked vehicles, etc.

The first sensor data 603 may comprise sensor data captured at a same time (e.g., a plurality of frames from a plurality of cameras captured at the same time). The first sensor data 603 may also comprise sensor data captured within a time window (e.g., a time window of video data). For example, assuming that the environmental state is determined every 200 ms, the first sensor data 603 may correspond to a most recently captured 200 ms of sensor data.

The method of FIG. 6 also includes comparing 604 (e.g., by the automation computing system 116, by the automation module 220 of the automation computing system 116) the environmental state to a predicted environmental state relative to the autonomous vehicle. The predicted environmental state comprises an estimation or prediction of what the environmental state would be based on previously captured sensor data. In other words, the environmental state corresponds to an actual state of the environment relative to the autonomous vehicle 100 at a given time (e.g., a current time), while the predicted environmental state corresponds to a predicted state of the environment relative to the autonomous vehicle 100 at the given time. The predicted environmental state may be based on one or more previously determined environmental states determined based on the previously captured sensor data. The predicted environmental state may also be based on additional sensor data. For example, assume a 200 ms window of sensor data was used to determine the previously determined environmental state. The predicted environmental state may be determined based on the previously determined environmental state and sensor data recorded prior to the 200 ms window (e.g., a 500 ms window that may or may not overlap the 200 ms window of sensor data).

The previously captured sensor data and/or previously determined environmental states may be used to predict how visual anchors in a previously determined environmental state will change over time. As objects relative to the automated vehicle 100 move, their corresponding visual anchors (e.g., their two-dimensional projections in sensor data from cameras) will change in pixel width, pixel height, pixel area, and/or pixel region. Accordingly, the predicted environmental state may comprise a predicted arrangement of the visual anchors. The predicted arrangement of the visual anchors may be determined based on one or more machine learning models (e.g., the selected machine learning model at the time at which the video data was captured, a kinetic field estimator to predict the motion and location of visual anchors), etc.

Comparing 604 the environmental state to the predicted environmental state relative to the autonomous vehicle may comprise determining a differential between the environmental state and the predicted environmental state. The differential comprises a quantified representation of a difference between the environmental state and the predicted environmental state. For example, determining the differential between the environmental state and the predicted environmental state may comprise determining a distance between multidimensional value representations of the environmental state and the predicted environmental state. A lower differential indicates that objects in the environment relative to the automated vehicle 100 are moving and behaving as predicted. A higher differential indicates that objects in the environment relative to the automated vehicle 100 are moving and behaving unpredictably when compared to the predicted environmental state. Accordingly, a different machine learning model may need to be selected to determine operational commands for the automated vehicle 100.

The method of FIG. 6 further comprises determining 606 (e.g., by the automation computing system 116, by the automation module of 220 of the automation computing system 116), based on a differential between the environmental state and the predicted environmental state, whether to select a second machine learning model as the selected machine learning model. For example, the differential is expressed as a quantified value that is compared to a threshold. Where the differential falls below the threshold, the first machine learning model may be kept as the selected machine learning model. Where the differential meets the threshold, the second machine learning model may be selected as the selected machine learning model.

The method of FIG. 6 may be performed at a predefined frequency or interval during operation of the automated vehicle 100. Thus, the automation computing system 116 repeatedly determines whether or not the environmental state changes as predicted, and selects an appropriate machine learning model for operation.

For example, assume that an automated vehicle 100 is performing a lane change to the right. The automation computing system 116 has selected a first machine learning model corresponding to a lane changing driving mode. Accordingly, operational commands for the automated vehicle 100 are determined (e.g., by the automation module 220) based on the first machine learning model. As the automated vehicle 100 performs the lane change according to the operational commands from the automation computing system 116, the automation computing system 116 determines 602 the environmental state of the automated vehicle 100 based on first sensor data 603.

The automation computing system 116 then compares 604 the environmental state to a predicted environmental state. The predicted environmental state reflects the predicted state of the environment relative to the automated vehicle 100 (e.g., predicted locations of other vehicles, lanes, or other objects). Assuming that all objects in the environmental state are close to the predicted environmental state, the differential between the environmental state and predicted environmental state would fall below the threshold. Accordingly, it would be determined that the first machine learning model (e.g., the lane changing model) would be kept as the selected machine learning model. The automation computing system 116 would then continue to determine operational commands to complete the lane change.

In contrast, assume that a car in the lane into which the automated vehicle 100 is changing accelerates at an unpredicted or illegal rate. Here, completing the lane change operation may result in a collision with the car, and the lane change operation should be abandoned. The car would, in the environmental state (e.g., the first sensor data 603), be closer to the automated vehicle 100 when compared to the predicted environmental state. For example, a pixel width, height, or area of the car in the environmental state would be larger than in the predicted environmental state. Accordingly, comparing the environmental state to the predicted environmental state would result in a differential exceeding the threshold. The automation computing system 116 may then select a second machine learning model configured for abandoning lane changes and repositioning the automated vehicle 110 in its original lane.

Readers will appreciate that in order to detect out-of-model scenarios, the model may be designed to incorporate self-consistency checks which can be tested at runtime. A model designed this way calculates two (or more) results: an estimation of features based on inputs (such as a camera) and a prediction of those features in the future t+τ. At the point t+τ the runtime may determine whether the prediction from time t matches the estimation at time t+τ. Based on a pre-determined (or tuned) threshold value, the system can determine if the prior prediction sufficiently matches reality and thereby detect if the scenario is sufficiently represented in the trained model.

Training a model, such as for driving a car, may benefit from a method to test if the model is accurately understanding the current scenario and can predict a correct action. In its simplest form, a model may "see" pixel from a camera and predict the steering wheel angle as well as the gas and brake pedal position. The model may make that prediction based on learned behavior of similar situations that were part of the training set. However, since it is impossible to train one model with all possible scenarios, a common way is to select a model which best or most likely fits the current environment by adding a self-validation of the model into the model at training time.

A model which can self-validate may be made the following way: the model takes an input I comprised of a number of sensors (e.g., for an autonomous car this could be cameras, inertial measurement units, CAN data etc.) and computes feature channels. For each feature, the model computes two feature channels F: one $F_E$ at point t which is an estimation of the feature (e.g., which camera pixels contain cars) and a second feature channel $F_P$ at point t+τ. The feature channel $F_P$ at t+τ may encode the prediction of the world at the point t+τ in the future. As time progresses by τ, the model may compute a new estimation $F_E$ at t+τ of and compare it with the prediction of $F_P$ for time t+τ. If prediction and estimation are within the threshold (thresholds are domain specific), then the model did an accurate prediction and is within its bounds. If the threshold is exceeded, then the model is not accurately predicting the future and is operating outside its bounds.

Figure 7:
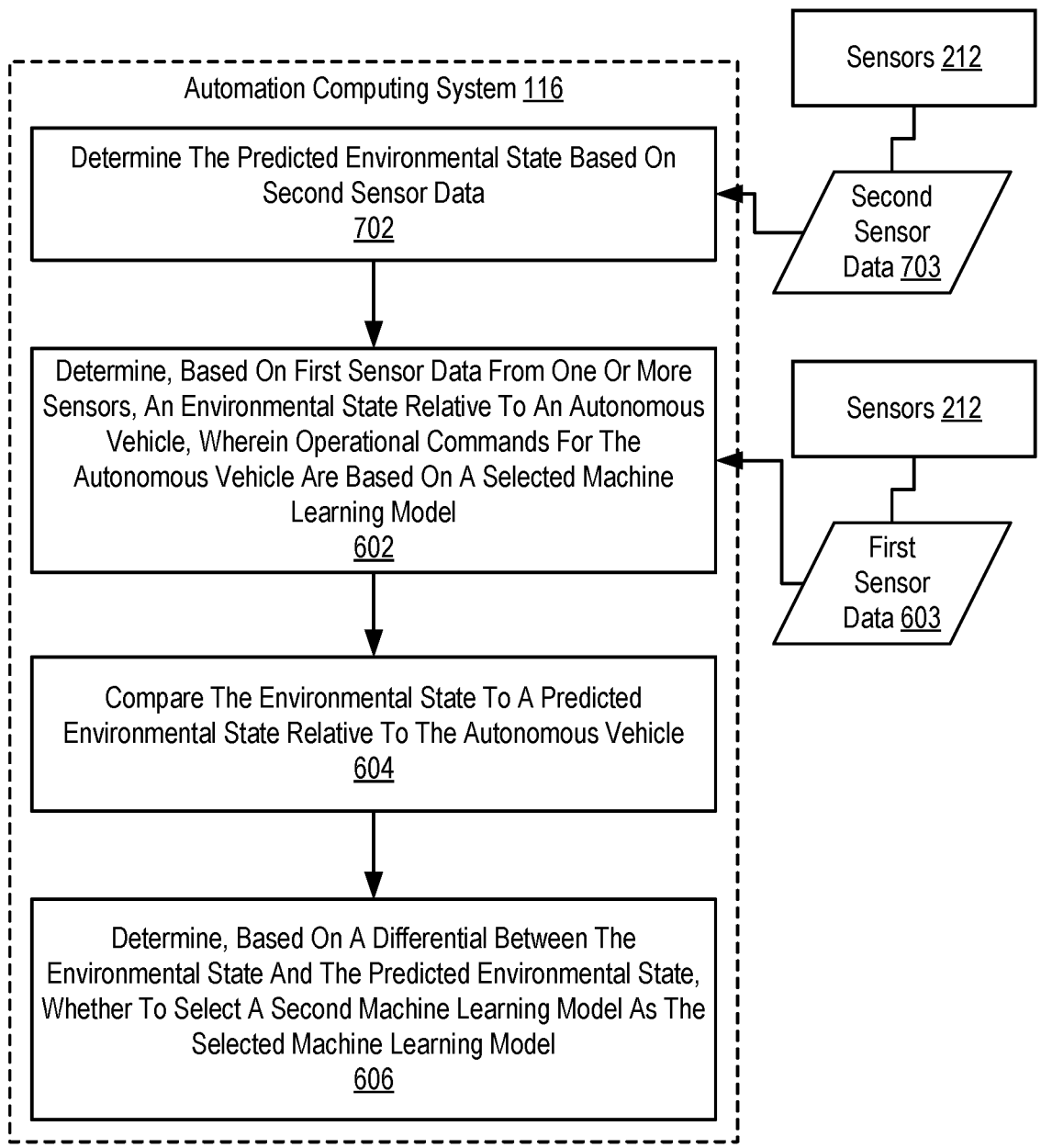
FIG. 7 is a flowchart of an example method for detecting out-of-model scenarios for an autonomous vehicle.

For further explanation, FIG. 7 sets forth a flow chart illustrating an exemplary method for detecting out-of-model scenarios for an autonomous vehicle that includes determining 602 (e.g., by an automation computing system 116, by an automation module 220 of the automation computing system 116), based on first sensor data 603 from one or more sensors 212, an environmental state relative to the autonomous vehicle 100, wherein operational commands for the autonomous vehicle 100 are based on a selected machine learning model, wherein the selected machine learning model comprises a first machine learning model; comparing 100 the environmental state to a predicted environmental state relative to the autonomous vehicle; and determining 606, based on a differential between the environmental state and the predicted environmental state, whether to select a second machine learning model as the selected machine learning model.

The method of FIG. 7 differs from FIG. 6 in that the method of FIG. 7 also includes determining 702 (e.g., by the automation computing system 116, by the automation module 220 of the automation computing system 116) the predicted environmental state based on second sensor data 703. The second sensor data 703 may comprise sensor data received (e.g., by the automation computing system 116) during a time window ending at a time offset relative to a current time. For example, assume that the environmental state is determined based on first sensor data 603 received within a 200 ms window ending at a current time. The predicted environmental state may be determined based on sensor data received within a time window (e.g., 200 ms, 600 ms, etc.) ending at 200 ms before the current time.

Determining the predicted environmental state may comprise determining one or more visual anchors in the second sensor data 703 and predicting an arrangement of the one or more visual anchors in the predicted environmental state. The arrangement may be predicted based on an expected rate of change in pixel area, pixel width, pixel height, etc. of a respective visual anchor based on a predicted movement of the object corresponding to the visual anchor. Accordingly, the arrangement may be predicted based on a machine learning model accepting as inputs the second sensor data 703, one or more previously determined environmental states, one or more previous environmental states determined based on the second sensor data 703, etc.

Figure 8:
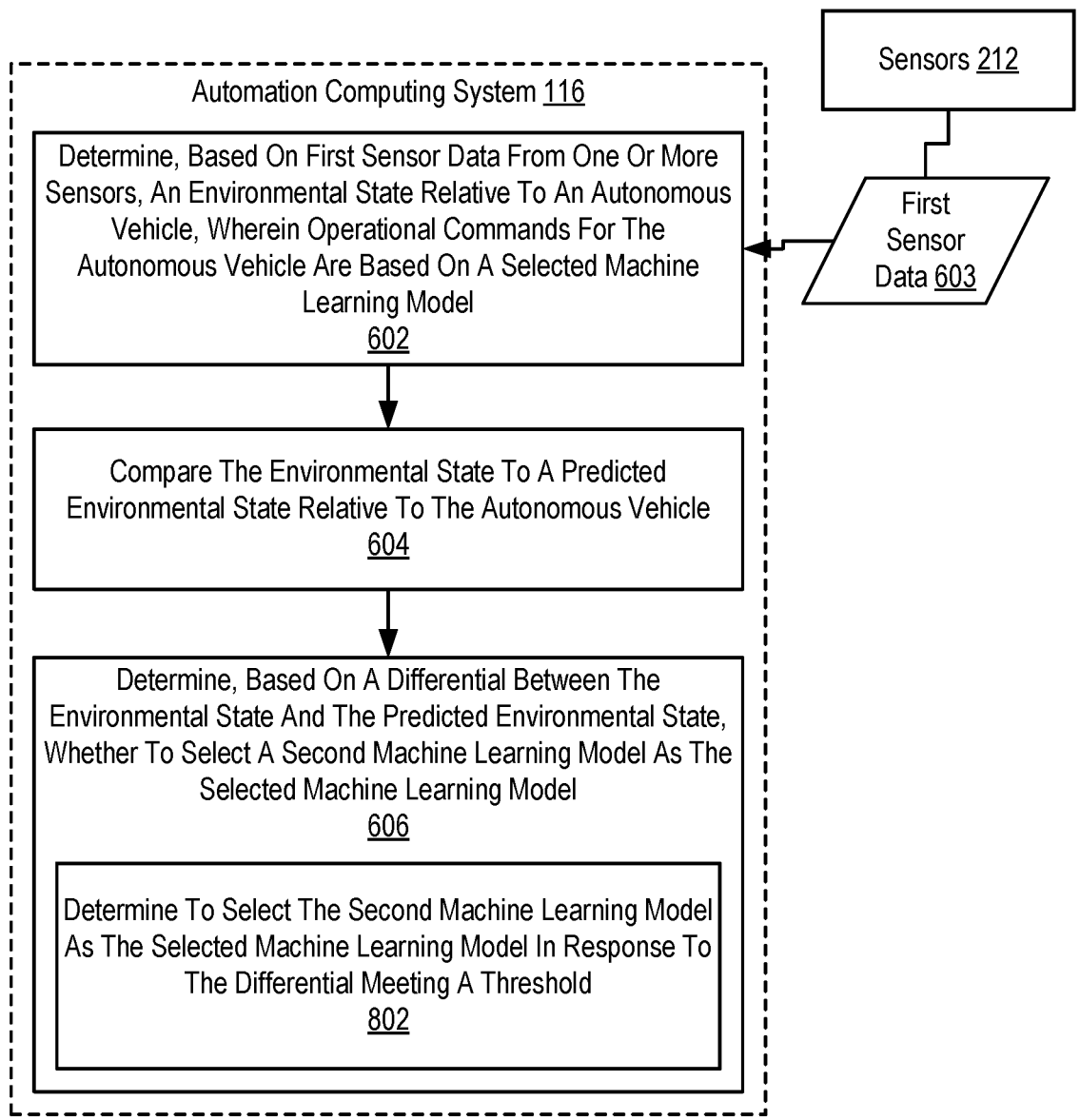
FIG. 8 is a flowchart of an example method for detecting out-of-model scenarios for an autonomous vehicle.

For further explanation, FIG. 8 sets forth a flow chart illustrating an exemplary method for detecting out-of-model scenarios for an autonomous vehicle that includes determining 602 (e.g., by an automation computing system 116, by an automation module 220 of the automation computing system 116), based on first sensor data 603 from one or more sensors 212, an environmental state relative to the autonomous vehicle 100, wherein operational commands for the autonomous vehicle 100 are based on a selected machine learning model, wherein the selected machine learning model comprises a first machine learning model; comparing 100 the environmental state to a predicted environmental state relative to the autonomous vehicle; and determining 606, based on a differential between the environmental state and the predicted environmental state, whether to select a second machine learning model as the selected machine learning model.

The method of FIG. 8 differs from FIG. 6 in that determining 606, based on a differential between the environmental state and the predicted environmental state, whether to select a second machine learning model as the selected machine learning model comprises determining 802 to select the second machine learning model as the selected machine learning model in response to the differential meeting a threshold.

For example, assume that an automated vehicle 100 is cruising on a highway, maintaining a particular speed and distance between other cars. The automation computing system 116 has selected a first machine learning model corresponding to a cruising driving mode. Accordingly, operational commands for the automated vehicle 100 are determined (e.g., by the automation module 220) based on the first machine learning model. As the automated vehicle 100 cruises according to the operational commands from the automation computing system 116, the automation computing system 116 determines 602 the environmental state of the automated vehicle 100 based on first sensor data 603 and compares 604 the environmental state to a predicted environmental state.

Assume that a car in front of the automated vehicle 116 applies their brakes, decelerating at an unexpected rate. Here, maintaining a cruising speed may result in a collision with the car The car would, in the environmental state (e.g., the first sensor data 603), be closer to the automated vehicle 100 when compared to the predicted environmental state. For example, a pixel width, height, or area of the car in the environmental state would be larger than in the predicted environmental state. Accordingly, comparing the environmental state to the predicted environmental state would result in a differential exceeding the threshold. The automation computing system 116 may then select a second machine learning model configured for performing a lane change to avoid the car, or to decelerate to avoid collision with the car. The particular second machine learning model may be selected based on the current environmental state, one or more safety rules, or by another approach.

Figure 9:
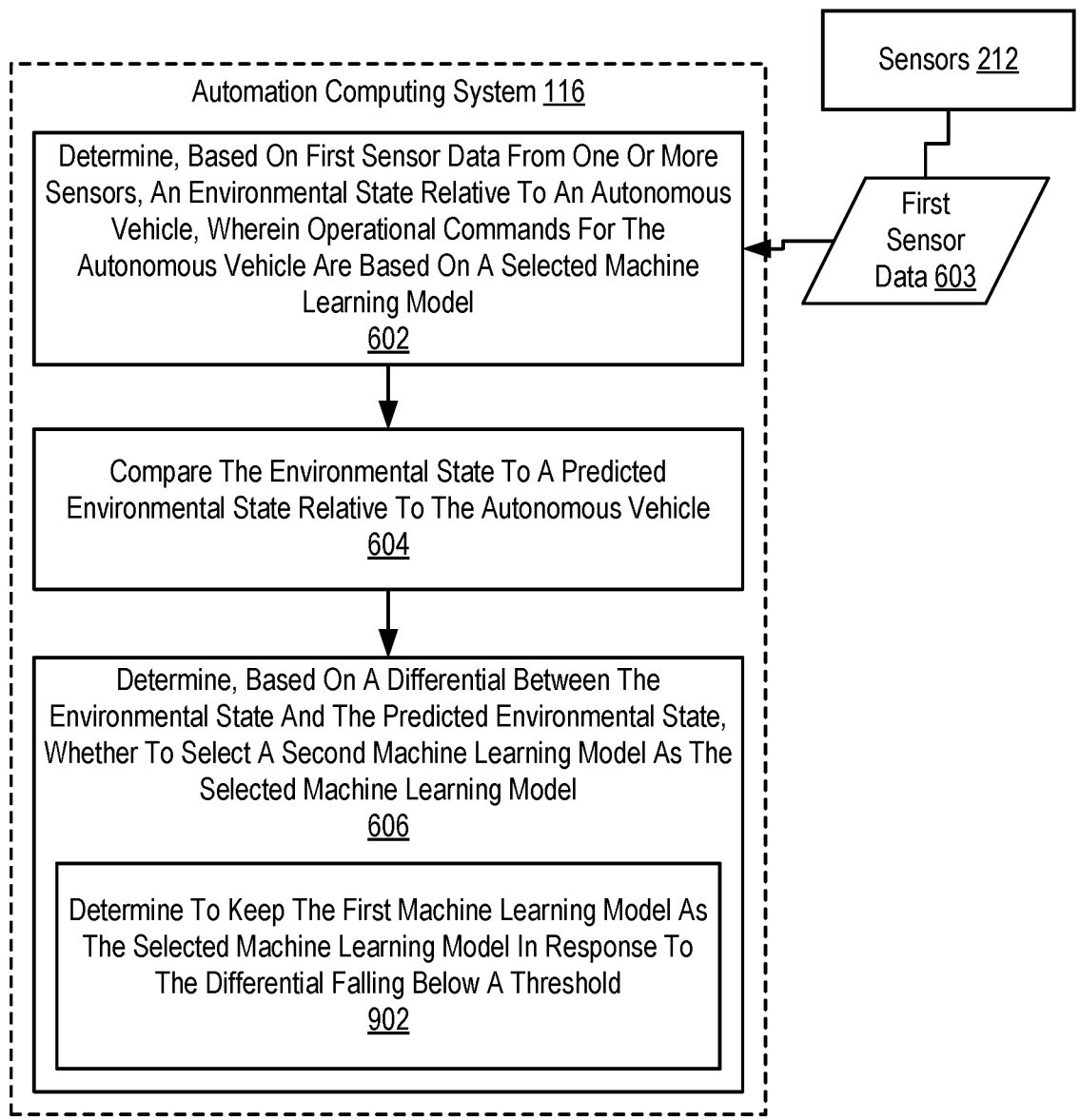
FIG. 9 is a flowchart of an example method for detecting out-of-model scenarios for an autonomous vehicle.

For further explanation, FIG. 9 sets forth a flow chart illustrating an exemplary method for detecting out-of-model scenarios for an autonomous vehicle that includes determining 602 (e.g., by an automation computing system 116, by an automation module 220 of the automation computing system 116), based on first sensor data 603 from one or more sensors 212, an environmental state relative to the autonomous vehicle 100, wherein operational commands for the autonomous vehicle 100 are based on a selected machine learning model, wherein the selected machine learning model comprises a first machine learning model; comparing 100 the environmental state to a predicted environmental state relative to the autonomous vehicle; and determining 606, based on a differential between the environmental state and the predicted environmental state, whether to select a second machine learning model as the selected machine learning model.

The method of FIG. 9 differs from FIG. 6 in that determining 606, based on a differential between the environmental state and the predicted environmental state, whether to select a second machine learning model as the selected machine learning model comprises determining 302 to keep the first machine learning model as the selected machine learning model in response to the differential falling below a threshold.

For example, assume that an automated vehicle 100 is cruising on a highway, maintaining a particular speed and distance between other cars. The automation computing system 116 has selected a first machine learning model corresponding to a cruising driving mode. Accordingly, operational commands for the automated vehicle 100 are determined (e.g., by the automation module 220) based on the first machine learning model. As the automated vehicle 100 cruises according to the operational commands from the automation computing system 116, the automation computing system 116 determines 602 the environmental state of the automated vehicle 100 based on first sensor data 603 and compares 604 the environmental state to a predicted environmental state.

Assume that all other objects (e.g., lane markers, other cars) behave as predicted according to the predicted environmental state. Comparing the environmental state to the predicted environmental state would result in a differential falling below the threshold. The automation computing system 116 would then keep the first machine learning model as the selected machine learning model.

Figure 10:
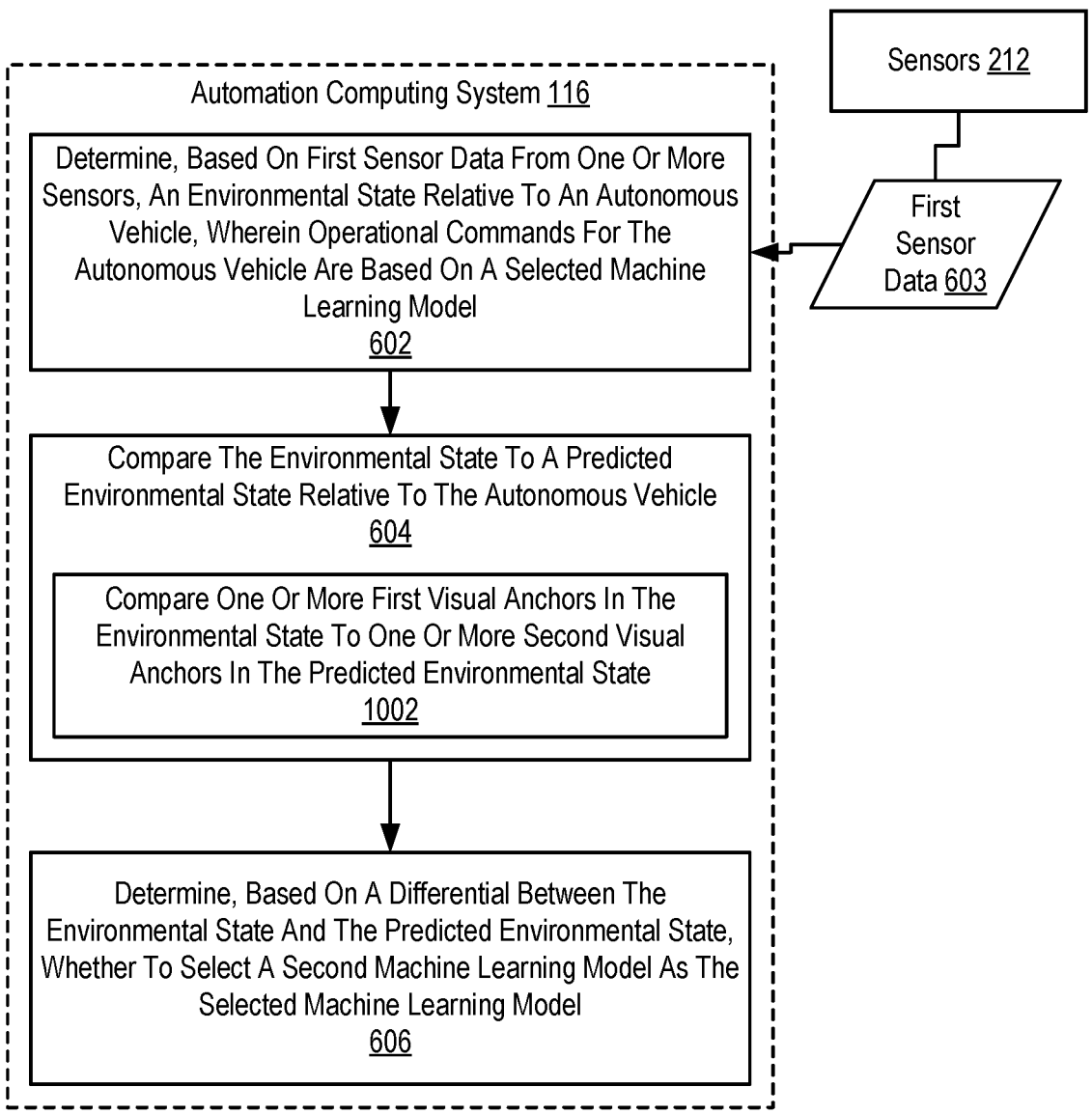
FIG. 10 is a flowchart of an example method for detecting out-of-model scenarios for an autonomous vehicle.

For further explanation, FIG. 10 sets forth a flow chart illustrating an exemplary method for detecting out-of-model scenarios for an autonomous vehicle that includes determining 602 (e.g., by an automation computing system 116, by an automation module 220 of the automation computing system 116), based on first sensor data 603 from one or more sensors 212, an environmental state relative to the autonomous vehicle 100, wherein operational commands for the autonomous vehicle 100 are based on a selected machine learning model, wherein the selected machine learning model comprises a first machine learning model; comparing 100 the environmental state to a predicted environmental state relative to the autonomous vehicle; and determining 606, based on a differential between the environmental state and the predicted environmental state, whether to select a second machine learning model as the selected machine learning model.

The method of FIG. 10 differs from FIG. 6 in that comparing 604 the environmental state to a predicted environmental state relative to the autonomous vehicle 100 comprises comparing 1002 one or more first visual anchors in the environmental state to one or more second visual anchors in the predicted environmental state. Comparing 1002 one or more first visual anchors in the environmental state to one or more second visual anchors in the predicted environmental state may comprise comparing pixel heights, pixel widths, pixel areas, or other attributes of corresponding visual anchors (e.g., comparing a first visual anchor to its corresponding second visual anchor). For example, each pixel height, pixel width, or pixel area for each first or second visual anchor may comprise a value in a multidimensional array or vector. A first multidimensional vector may correspond to the environmental state and comprise values for the first visual anchors, and a second multidimensional vector may correspond to the environmental state and comprise values for the second visual anchors. Comparing one or more first visual anchors to one or more second visual anchors may comprise finding a distance or other value between the first multidimensional vector and the second multidimensional vector.

As another example, each value for a first visual anchor may be compared to the value of its corresponding visual anchor to determine a corresponding differential. Each differential may then be compared to the threshold to when determining 606 whether to select a second machine learning model as the selected machine learning model.

In view of the explanations set forth above, readers will recognize that the benefits of detecting out-of-model scenarios for an autonomous vehicle according to embodiments of the present invention include:

Improved performance of an autonomous vehicle by allowing for dynamically transitioning between machine models used to control the autonomous vehicle based on comparisons between current and predicted environmental conditions.

Improved performance of an autonomous vehicle by dynamically transitioning between machine models used to control the autonomous vehicle using video data.

Exemplary embodiments of the present invention are described largely in the context of a fully functional computer system for detecting out-of-model scenarios for an autonomous vehicle. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for detecting out-of-model scenarios for an autonomous vehicle, comprising:
    determining, based on first sensor data from one or more sensors, an environmental state external to the autonomous vehicle, wherein the environmental state comprises an arrangement of one or more visual anchors identified in the first sensor data, wherein operational commands for the autonomous vehicle are output by a selected machine learning model, wherein the selected machine learning model comprises a first machine learning model;
    comparing the environmental state to a predicted environmental state external to the autonomous vehicle, wherein the predicted environmental state comprises a predicted arrangement of the one or more visual anchors;
    determining, based on a differential between the environmental state and the predicted environmental state, whether to select a second machine learning model as the selected machine learning model;
    performing, by the autonomous vehicle, one or more operational commands output by the selected machine learning model; and
    wherein the first machine learning model and the second machine learning model are included in a plurality of machine learning models, wherein each machine learning model of the plurality of machine learning models corresponds to a respective driving mode of the autonomous vehicle.

2. The method of claim 1, further comprising determining the predicted environmental state based on second sensor data.

3. The method of claim 2, wherein the second sensor data comprises sensor data associated with a time window ending at a time offset relative to a current time.

4. The method of claim 1, wherein determining, based on the differential between the environmental state and the predicted environmental state, whether to select the second machine learning model as the selected machine learning model comprises determining to select the second machine learning model as the selected machine learning model in response to the differential meeting a threshold.

5. The method of claim 1, wherein determining, based on the differential between the environmental state and the predicted environmental state, whether to select the second machine learning model as the selected machine learning model comprises determining to keep the first machine learning model as the selected machine learning model in response to the differential falling below a threshold.

6. The method of claim 1, wherein comparing the environmental state to the predicted environmental state comprises comparing the arrangement of the one or more visual anchors in the environmental state to the predicted arrangement of the one or more visual anchors in the predicted environmental state.

7. The method of claim 6, wherein comparing the arrangement of the one or more visual anchors in the environmental state to the predicted arrangement of the one or more visual anchors in the predicted environmental state comprises calculating a distance between a first multidimensional vector based on to the arrangement of the one or more visual anchors in the environmental state and a second multidimensional vector based on the predicted arrangement of the one or more visual anchors in the predicted environmental state.

8. An apparatus for detecting out-of-model scenarios for an autonomous vehicle, the apparatus configured to perform steps comprising:
   determining, based on first sensor data from one or more sensors, an environmental state external to the autonomous vehicle, wherein the environmental state comprises an arrangement of one or more visual anchors identified in the first sensor data, wherein operational commands for the autonomous vehicle are output by a selected machine learning model, wherein the selected machine learning model comprises a first machine learning model;
   comparing the environmental state to a predicted environmental state external to the autonomous vehicle, wherein the predicted environmental state comprises a predicted arrangement of the one or more visual anchors;
   determining, based on a differential between the environmental state and the predicted environmental state, whether to select a second machine learning model as the selected machine learning model;
   performing, by the autonomous vehicle, one or more operational commands output by the selected machine learning model; and
   wherein the first machine learning model and the second machine learning model are included in a plurality of machine learning models, wherein each machine learning model of the plurality of machine learning models corresponds to a respective driving mode of the autonomous vehicle.

9. The apparatus of claim 8, wherein the steps further comprise determining the predicted environmental state based on second sensor data.

10. The apparatus of claim 9, wherein the second sensor data comprises sensor data associated with a time window ending at a time offset relative to a current time.

11. The apparatus of claim 8, wherein determining, based on the differential between the environmental state and the predicted environmental state, whether to select the second machine learning model as the selected machine learning model comprises determining to select the second machine learning model as the selected machine learning model in response to the differential meeting a threshold.

12. The apparatus of claim 8, wherein determining, based on the differential between the environmental state and the predicted environmental state, whether to select the second machine learning model as the selected machine learning model comprises determining to keep the first machine learning model as the selected machine learning model in response to the differential falling below a threshold.

13. The apparatus of claim 8, wherein comparing the environmental state to the predicted environmental state comprises comparing the arrangement of the one or more visual anchors in the environmental state to the predicted arrangement of the one or more visual anchors in the predicted environmental state.

14. An autonomous vehicle for detecting out-of-model scenarios for an autonomous vehicle, comprising:
   determining, based on first sensor data from one or more sensors, an environmental state external to the autonomous vehicle, wherein the environmental state comprises an arrangement of one or more visual anchors identified in the first sensor data, wherein operational commands for the autonomous vehicle are output by a selected machine learning model, wherein the selected machine learning model comprises a first machine learning model;
   comparing the environmental state to a predicted environmental state external to the autonomous vehicle, wherein the predicted environmental state comprises a predicted arrangement of the one or more visual anchors;
   determining, based on a differential between the environmental state and the predicted environmental state, whether to select a second machine learning model as the selected machine learning model;
   performing, by the autonomous vehicle, one or more operational commands output by the selected machine learning model; and
   wherein the first machine learning model and the second machine learning model are included in a plurality of machine learning models, wherein each machine learning model of the plurality of machine learning models corresponds to a respective driving mode of the autonomous vehicle.

15. The autonomous vehicle of claim 14, wherein the steps further comprise determining the predicted environmental state based on second sensor data.

16. The autonomous vehicle of claim 15, wherein the second sensor data comprises sensor data associated with a time window ending at a time offset relative to a current time.

17. The autonomous vehicle of claim 14, wherein determining, based on the differential between the environmental state and the predicted environmental state, whether to select the second machine learning model as the selected machine learning model comprises determining to select the second machine learning model as the selected machine learning model in response to the differential meeting a threshold.

18. The autonomous vehicle of claim 14, wherein determining, based on the differential between the environmental state and the predicted environmental state, whether to select the second machine learning model as the selected machine learning model comprises determining to keep the first machine learning model as the selected machine learning model in response to the differential falling below a threshold.

19. The autonomous vehicle of claim 14, wherein comparing the environmental state to the predicted environmental state comprises comparing the arrangement of the one or more visual anchors in the environmental state to the predicted arrangement of the one or more visual anchors in the predicted environmental state.

20. A computer program product disposed upon a non-transitory computer readable medium, the computer program product comprising computer program instructions for detecting out-of-model scenarios for an autonomous vehicle that, when executed, cause a computer system of the autonomous vehicle to carry out the steps of:

determining, based on first sensor data from one or more sensors, an environmental state external to the autonomous vehicle, wherein the environmental state comprises an arrangement of one or more visual anchors identified in the first sensor data, wherein operational commands for the autonomous vehicle are output by a selected machine learning model, wherein the selected machine learning model comprises a first machine learning model;

comparing the environmental state to a predicted environmental state external to the autonomous vehicle, wherein the predicted environmental state comprises a predicted arrangement of the one or more visual anchors;

determining, based on a differential between the environmental state and the predicted environmental state, whether to select a second machine learning model as the selected machine learning model;

performing, by the autonomous vehicle, one or more operational commands output by the selected machine learning model; and wherein the first machine learning model and the second machine learning model are included in a plurality of machine learning models, wherein each machine learning model of the plurality of machine learning models corresponds to a respective driving mode of the autonomous vehicle.

* * * * *